US012574673B2

(12) United States Patent
Braun et al.

(10) Patent No.: US 12,574,673 B2
(45) Date of Patent: Mar. 10, 2026

(54) EARPIECE AND EARHOOK FOR THE SAME

(71) Applicant: 3M INNOVATIVE PROPERTIES COMPANY, St. Paul, MN (US)

(72) Inventors: Katrin Braun, Montreal (CA); Bernard Daoust, Montreal (CA); Antoine J. Bernier, Montreal (CA)

(73) Assignee: 3M Innovative Properties Company, St. Paul, MN (US)

( * ) Notice: Subject to any disclaimer, the term of this patent is extended or adjusted under 35 U.S.C. 154(b) by 225 days.

(21) Appl. No.: 18/550,731

(22) PCT Filed: Mar. 17, 2022

(86) PCT No.: PCT/US2022/020750
§ 371 (c)(1),
(2) Date: Sep. 15, 2023

(87) PCT Pub. No.: WO2022/197924
PCT Pub. Date: Sep. 22, 2022

(65) Prior Publication Data

US 2024/0365045 A1 Oct. 31, 2024

Related U.S. Application Data

(60) Provisional application No. 63/162,344, filed on Mar. 17, 2021.

(51) Int. Cl.
*H04R 1/10* (2006.01)

(52) U.S. Cl.
CPC .................................... *H04R 1/105* (2013.01)

(58) Field of Classification Search
CPC .... H04R 1/105; H04R 1/1066; H04R 1/1075; H04R 2225/02; H04R 2201/10; H04R 5/0335; H04R 25/607
See application file for complete search history.

(56) References Cited

U.S. PATENT DOCUMENTS 2,930,856 A 3/1960 Toht
2019/0098388 A1 3/2019 Powell et al.

FOREIGN PATENT DOCUMENTS

WO WO-2009147370 A1 * 12/2009 ............. H04R 1/105

OTHER PUBLICATIONS

International Search Report for PCT International Application No. PCT/US2022/020750, mailed on Aug. 18, 2022, 5 pages.
Partial International Search for PCT International Application No. PCT/US2022/020750, mailed on Jun. 27, 2022, 10 pages.

* cited by examiner

*Primary Examiner* — Sunita Joshi

(57) ABSTRACT

A headset includes an earpiece with a speaker and a speaker port connectable with an eartip for insertion in an ear. The headset further includes an earhook with a first end coupled with the earpiece, a second end, and a length extending therebetween. The earhook has a transverse cross section along the length. The transverse cross section has a major cross dimension and a minor cross dimension orthogonal to the major cross dimension, the major cross dimension being greater than the minor cross dimension. A cable and a support wire are connected to the earpiece and embedded in the earhook along the length. The cable may include one or more electrical wires connecting the components of the earpiece to a device.

21 Claims, 8 Drawing Sheets

EARPIECE AND EARHOOK FOR THE SAME

CROSS REFERENCE TO RELATED APPLICATIONS

This application is a national stage filing under 35 U.S.C. 371 of PCT/US2022/020750, filed Mar. 17, 2022, which claims the benefit of U.S. Provisional Application No. 63/162,344, filed Mar. 17, 2021, the disclosure of which is incorporated by reference in its/their entirety herein.

RELATED APPLICATIONS

This application claims priority to U.S. Provisional Application No. 63/162,344 filed Mar. 17, 2021 entitled EARPIECE AND EARHOOK FOR THE SAME which is incorporated herein in its entirety.

FIELD

The present disclosure relates to earpieces for use with communications and audio devices. In particular, the present disclosure relates to an earhook for such earpieces.

SUMMARY

According to an embodiment, an earhook includes a first end couplable with an earpiece, a second end, and a length extending therebetween. The earhook has a transverse cross section along the length. The transverse cross section has a major cross dimension and a minor cross dimension orthogonal to the major cross dimension, the major cross dimension being greater than the minor cross dimension. A cable and a support wire are embedded in the earhook along the length. The cable may include one or more electrical wires.

According to an embodiment, a headset includes an earpiece with a speaker and a speaker port connectable with an eartip for insertion in an ear. The headset further includes an earhook with a first end coupled with the earpiece, a second end, and a length extending therebetween. The earhook has a transverse cross section along the length. The transverse cross section has a major cross dimension and a minor cross dimension orthogonal to the major cross dimension, the major cross dimension being greater than the minor cross dimension. A cable and a support wire are connected to the earpiece and embedded in the earhook along the length. The cable may include one or more electrical wires connecting the components of the earpiece to a device.

The length of the earhook may be curved to define a plane, where the major cross dimension extends along the plane. The cable and the support wire may be stacked along the major cross dimension. The transverse cross section of the earhook may be shaped as an ellipse, an oval, or an obround.

The earhook may include a first lumen housing the cable and a second lumen housing the support wire. The earhook may be constructed of a pre-formed dual lumen tube. In some embodiments, the earhook is constructed of a pre-formed tube that has a single lumen with two lobes in the transverse cross section. Pre-forming may include injection molding or extrusion.

The first end of the earhook may be encased in a first overmold for coupling the earhook to the earpiece. A portion of the first overmold may be inserted inside the earpiece. The first overmold may have a cross section that is shaped like the cross section of the earhook.

The support wire may extend inside the earpiece. The support wire may terminate at a pin within the earpiece. The end of the support wire may be wrapped about the pin.

DEFINITIONS

Figure 1A:
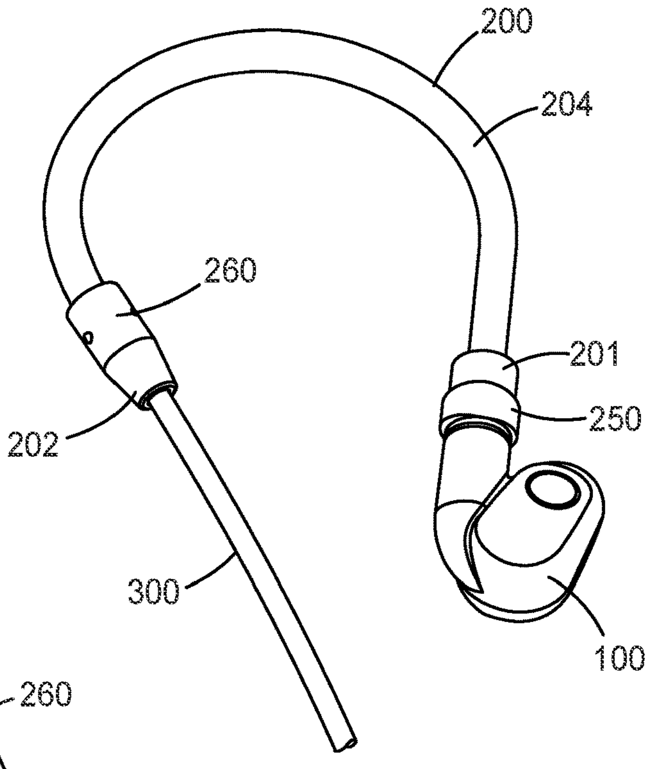
FIG. 1A is side view of an earpiece with an earhook according to an embodiment.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "elastomer" is used here to refer to a polymer with viscoelasticity (both viscosity and elasticity). Elastomers typically exhibit weak intermolecular forces, low Young's modulus, and high failure strain.

The term "transverse cross section" is used here to refer to a cross section that is orthogonal to a length (e.g., longitudinal axis) of the item.

The term "stacked" is used here to mean an arrangement where one component is directly on top of another component.

The term "substantially" as used here has the same meaning as "significantly," and can be understood to modify the term that follows by at least about 90%, at least about 95%, or at least about 98%.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood to have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have", "having", "include", "including", "comprise", "comprising" or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to earpieces for use with communications and audio devices. In particular, the present disclosure relates to an earhook for such earpieces.

Wired earpieces include electrical components connected to a wire or cable that may connect the earpiece components to a device, such as a communications or audio device. However, the weight of the cable may cause the earpiece to become dislodged from the ear, affecting the earpiece retention and seal with the ear canal.

The cables of a wired earpiece may be managed by using an earhook, which can be used to guide the cables over the ear and to position the earpiece in the ear. In an occluded ear, the earhook also prevents the wearer from hearing the rubbing of wires against clothing.

A common complaint from users of wired earpieces is that the earhook causes discomfort between the ear and the head. Further, the wired earpiece may interfere with other personal protective equipment (PPE), such as glasses.

It would be desirable to provide an earhook that provides improved comfort to a user. It would further be desirable to provide an earhook that minimizes interference with other gear, such as glasses.

According to an embodiment, a wired earpiece includes an earhook with a minimized diameter. The earhook may be custom-shapable to the user's ear. The earhook provides improved comfort due to its small cross-sectional dimension, custom shape, and the use of a soft, malleable outer casing. The earpiece may be part of a headset. A headset may include a pair of earpieces.

The wired earpiece includes a cable of electrical wires connecting the components of the earpiece to a device, such as a communications or audio device. The cable may terminate at a connector for coupling the cable with the device. The earpiece may be part of a headset that includes two earpieces. The earpieces in a headset may be mirrored such that one earpiece is constructed to be worn in the left ear and the other earpiece is constructed to be worn in the right ear. The cables of the two earpieces may be connected to the same connector. The wired earpiece also includes a support wire extending from the earpiece. The support wire may be made of malleable metal that may be bent by a user to a shape as desired, yet holds it shape when in use. The support wire enables custom shaping of the earhook. The support wire may have a length that extends through the length of the earhook. According to an embodiment, the earhook is coupled with the earpiece. The earhook includes the cable and the support wire encased in a tubular casing. The support wire may also be used to anchor the earhook to the earpiece to protect the cable from inadvertently being pulled out.

Reference is made now to the drawings that demonstrate an earpiece and associated earhook for use with a device (e.g., a communications device) according to embodiments of the present disclosure.

Figure 1B:
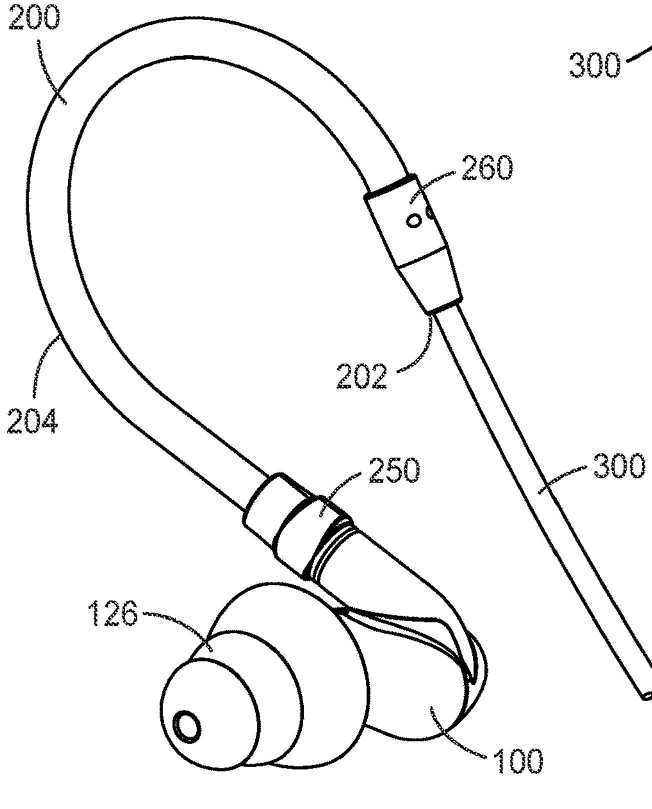
FIG. 1B is side view of the opposite side of the earpiece and earhook of FIG. 1A according to an embodiment.
Figure 1C:
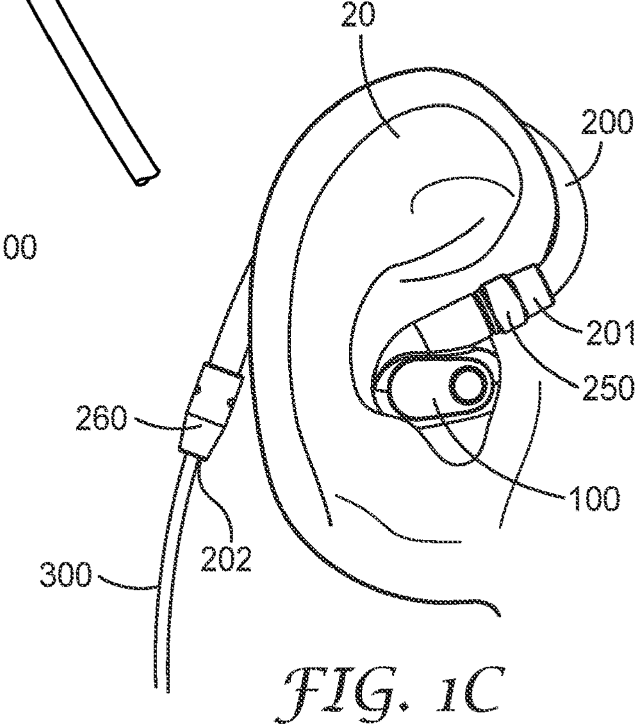
FIG. 1C is a side view of the earpiece and earhook of FIG. 1A inserted into an ear according to an embodiment.
Figure 2:
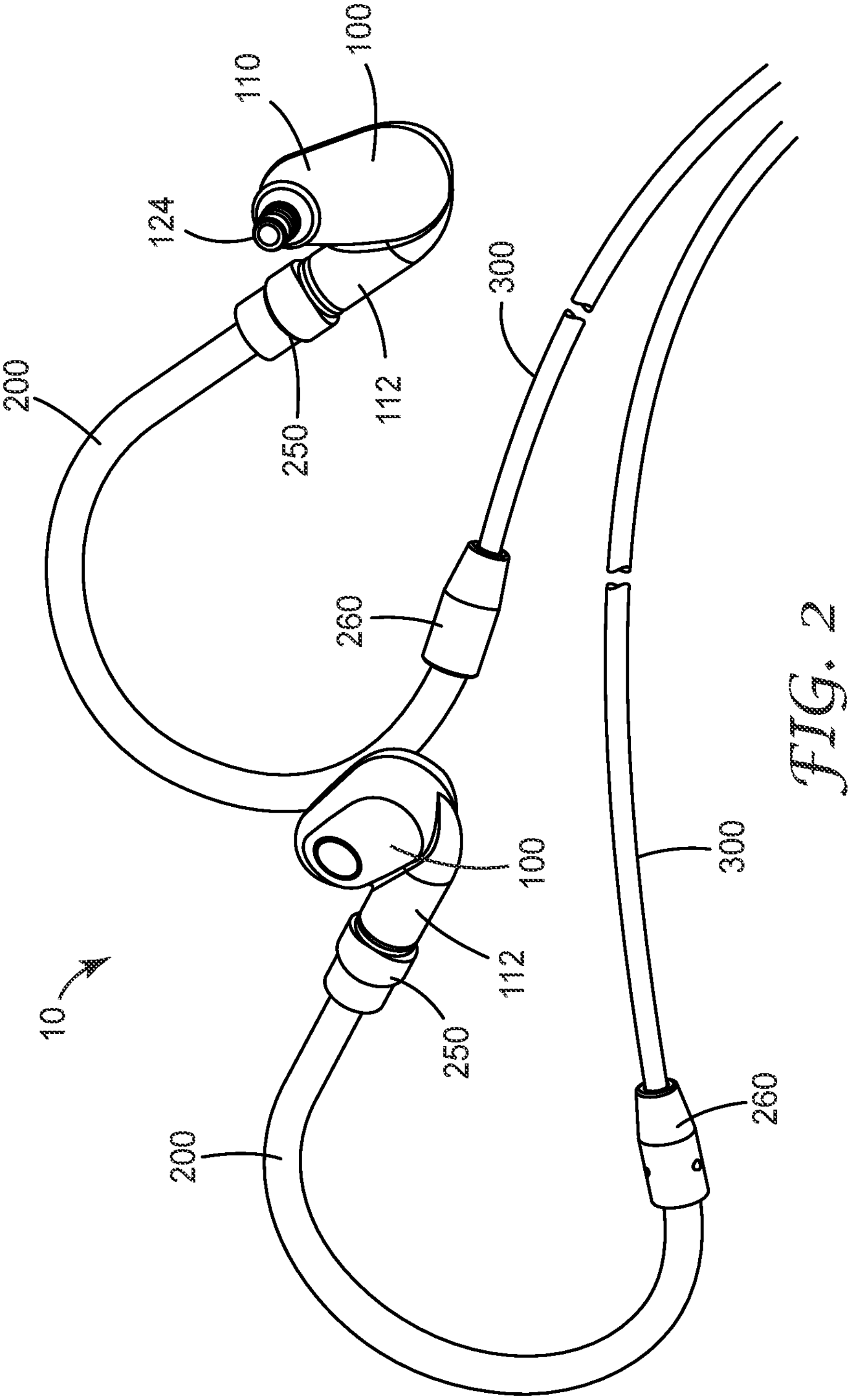
FIG. 2 is a partial perspective view of a headset with two earpieces and earhooks according to an embodiment.
Figure 3:
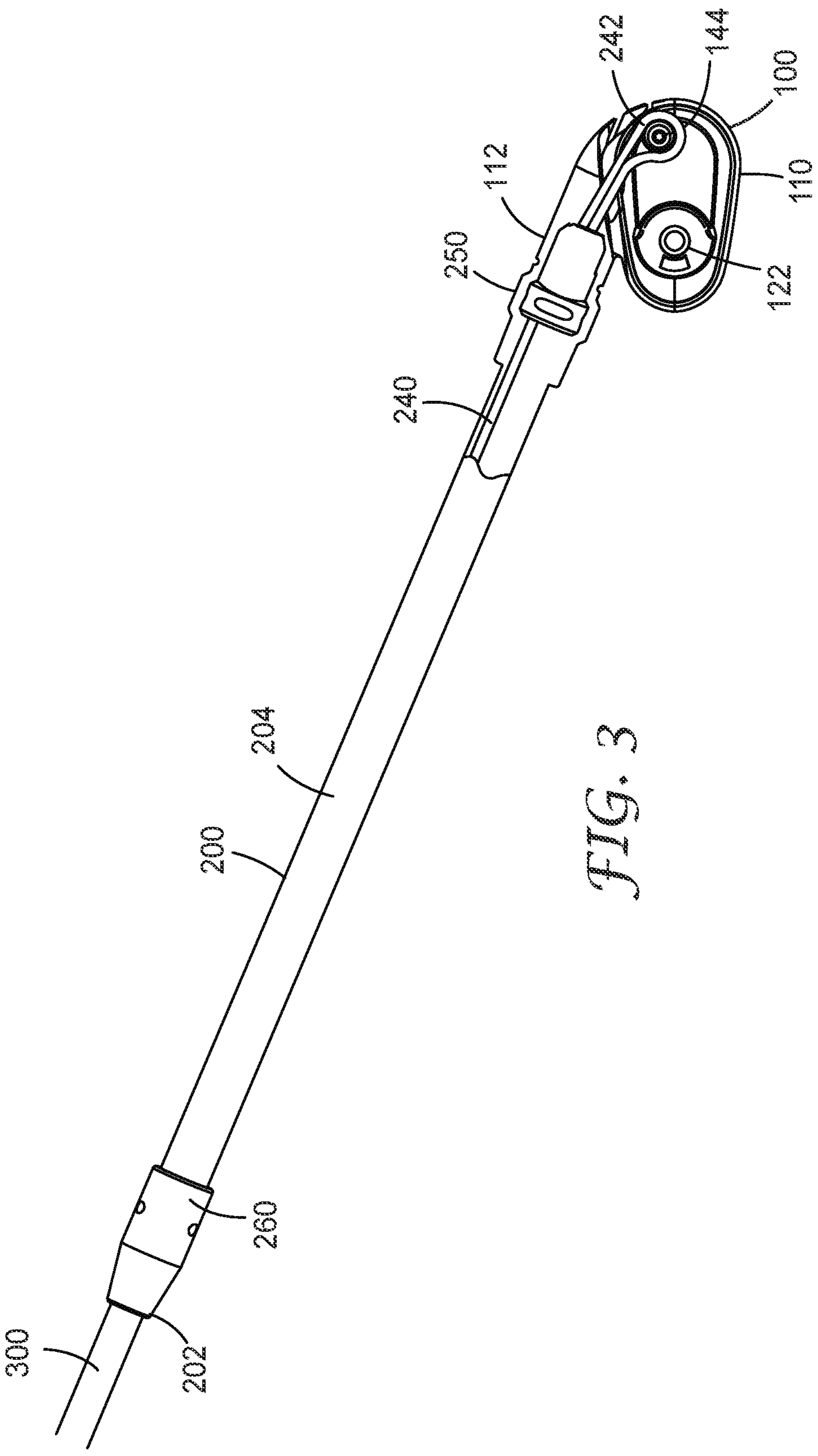
FIG. 3 is a side view of the earpiece and earhook of FIG. 1A, extended to its full length, according to an embodiment, with the outer casing partially removed.

FIGS. 1A and 1B show two sides of an exemplary earpiece 100 with an earhook 200 and a portion of a cable 300. The earpiece 100 is constructed to be used on the ear of a user such that the eartip is at least partially inserted into the ear canal and the earhook 200 wraps around the top of the ear, supporting the earpiece 100. FIG. 1C shows the earpiece 100 in use, inserted into the ear 20 of a user, with the earhook 200 bent around and disposed at least in part behind the outer ear 20. The earpiece 100 may be part of a headset 10 that includes a pair of earpieces 100, as shown in FIG. 2. The full length of the cables 300 is not shown.

According to an embodiment, the cable 300 extends from the earpiece 100 and connects the components of the earpiece 100 to a device. The cable 300 may include a plurality of electrical wires extending along the cable 300. The electrical wires may be encased in a sheath. The cable 300 extends through the earhook 200, shown as cable 230 in, for example, FIG. 4B.

The earhook 200 has a casing 204 containing the cable 230 and a support wire 240. The earhook 200 extends from a first end 201 to a second end 202. The first end 201 is coupled with the earpiece 100. The first end 201 may be covered with and formed by a first overmold 250. The first overmold 250 may couple the earhook 200 to the earpiece 100. The second end 202 may be covered with a second overmold 260. The overmolds 250, 260 may help maintain the cable 230, support wire 240, and casing 204 in place relative to one another, as well as help anchor the earhook 200 to the earpiece 100 and prevent the earhook 200 from twisting about its longitudinal axis relative to the earpiece 100.

The earpiece 100 may include various electrical and other components, such as a speaker 122, one or more microphones (for example, an outside microphone and an inside microphone), associated wires, and the like. The earpiece 100 may include a speaker port 124, shown in FIG. 2. The speaker port 124 is connectable with an eartip 126, as shown in FIG. 1B. The eartip 126 may be made from an elastomeric material that allows for the formation of an acoustic seal between the earpiece 100 and the ear canal. The eartip 126 may be removable and replaceable. In FIG. 1C, the eartip 126 is inserted into the ear of a user.

Figure 4A:
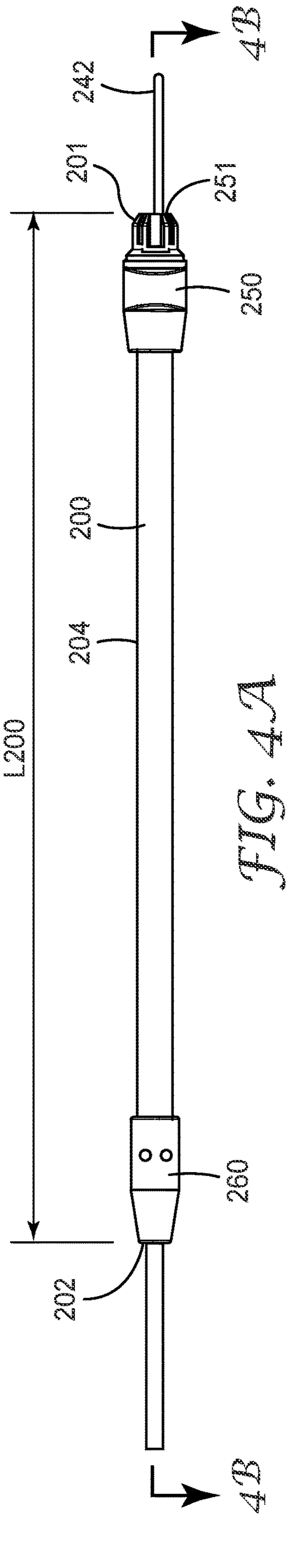
FIG. 4A is a side view of the earhook of FIG. 1A, extended to its full length, with first and second overmolds, according to an embodiment.
Figure 4B:
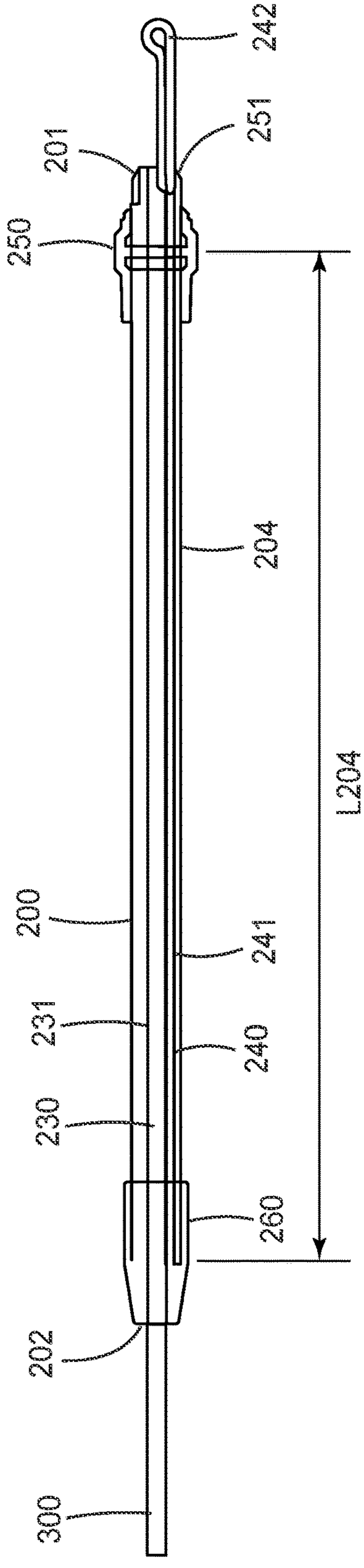
FIG. 4B is a partial cross-sectional side view of the earhook of FIG. 4A with a portion of the casing removed, according to an embodiment.

The earhook 200 is preferably moldable and shapable to a custom hook shape to fit a user's ear. The earhook 200 may be extended to be straight or may be bent to a desired curve. The earhook 200 is shown in FIGS. 3-5A extended (straightened) to its full length L200. The length L200 of the earhook 200 extends along a longitudinal axis from the end 251 of the first overmold 250 to the end of the second overmold 260 (second end 202), as shown in FIG. 4A. The casing 204 extends partly inside the first and second overmolds 250, 260, defining a length L204 shown in FIG. 4B.

Figure 5A:
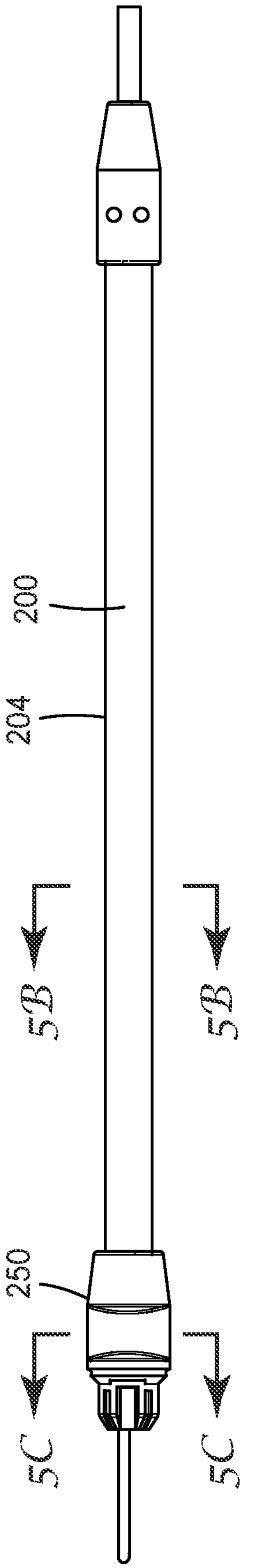
FIG. 5A is a side view of the earhook of FIG. 1A, extended to its full length, with first and second overmolds, according to an embodiment.
Figure 5B:
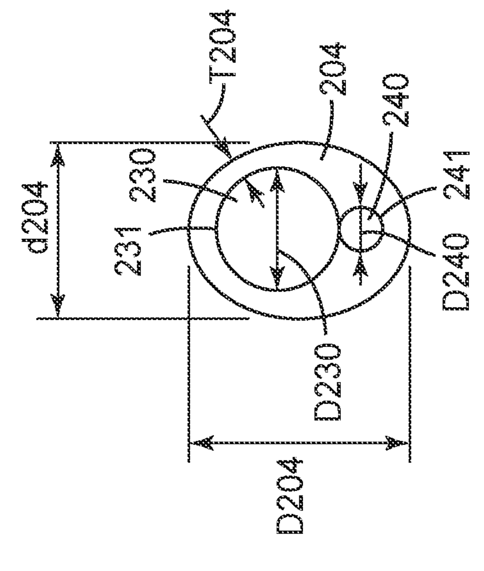
FIG. 5B is a transverse cross section of the earhook of FIG. 5A, according to an embodiment.
Figure 5C:
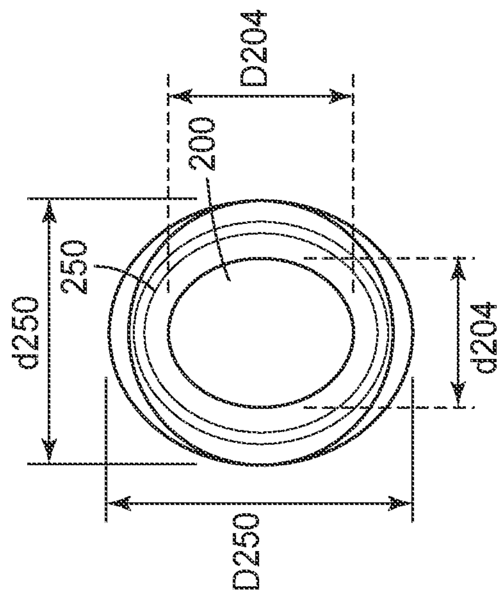
FIG. 5C is a transverse cross section of the first overmold of the earhook of FIG. 5A, according to an embodiment.

Referring now to FIGS. 5A and 5B, according to an embodiment, at a transverse cross section of the earhook 200 along the length L200 of the earhook 200, the casing 204 has a major cross dimension D204 and a cross dimension d204 that is orthogonal to the major cross dimension D204. The major cross dimension D204 is greater than the minor cross dimension d204. Providing the earhook 200 with a casing 204 that is narrower across one dimension than the other allows for a slimmer and more comfortable earhook design.

According to an embodiment, the casing 204 is a dual-lumen tube. The dual-lumen tube may be constructed to accommodate the cable 230 and the support wire 240 in separate lumens. As shown in FIG. 5B, the casing 204 may include a first lumen 231 and a second lumen 241. The first lumen 231 may be sized to accommodate the cable 230. The second lumen 241 may be sized to accommodate the support wire 240. Alternatively, the casing 204 may define a single lumen that can accommodate both the cable 230 and the support wire 240.

The cable 230 has a cross dimension D230 and the support wire 240 has a cross dimension D240. According to an embodiment, the cross dimension D240 of the support wire 240 is smaller than the cross dimension D230 of the cable 230. According to an embodiment, the casing 204 has a cross section having a wide end and a narrow end, where the cable 230 is disposed within the wide end and the support wire 240 is disposed within the narrow end. In one embodiment, the casing 204 has a cross section shaped as an oval, where the cable 230 is disposed within the wide end of the oval and the support wire 240 is disposed within the narrow end of the oval.

To the extent that it is possible without compromising the structural integrity of the casing 204, the overall cross-dimensional size of the casing 204 is minimized. In particular, it is desirable to minimize the minor cross dimension d204 of the casing 204. The minimum size of the minor cross dimension d204 may be dependent, in part, on the materials used to construct the casing 204 and other parts of the earhook 200. In some embodiments, the minor cross dimension d204 may be 5.0 mm or less, 4.5 mm or less, 4.2 mm or less, 4.0 mm or less, 3.8 mm or less, 3.6 mm or less, or 3.4 mm or less. There is no desired minimum value for the minor cross dimension d204 but in practice, the minor cross dimension d204 may be 2.0 mm or greater, 2.5 mm or greater, or 3.0 mm or greater. In some embodiments the minor cross dimension d204 is from 2.5 mm to 4.0 mm or from 3.0 mm to 3.8 mm. The major cross dimension D204 may be 6.0 mm or less, 5.5 mm or less, 5.0 mm or less, 4.5 mm or less, or 4.2 mm or less. The major cross dimension D204 may be 3.4 mm or greater, 3.8 mm or greater, or 4.0 mm or greater. In some embodiments the major cross dimension D204 is from 3.8 mm to 6.0 mm or from 4.0 mm to 5.0 mm.

According to an embodiment, the major cross dimension D204 is at least 10%, at least 15%, at least 20%, or at least 25% greater than the minor cross dimension d204. The major cross dimension D204 may be up to 100% greater than the minor cross dimension d204.

The casing 204 has a wall thickness T204. The minimum cross sectional dimension may be limited, in part, by the wall thickness T204. The wall thickness T204 may have a minimum value depending on the material of the casing 204. The minimum thickness of the wall may also be limited by manufacturing considerations related to the overall size of the casing 204. For example, a casing 204 may have a minimum wall thickness T204 of about 0.7 mm or 0.8 mm.

Figure 6A:
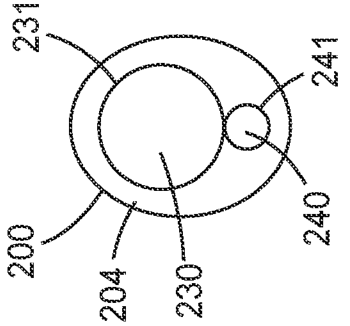
FIGS. 6A-6D are schematic transverse cross sectional views of the earhook of FIG. 1A, according to alternative embodiments.
Figure 6B:
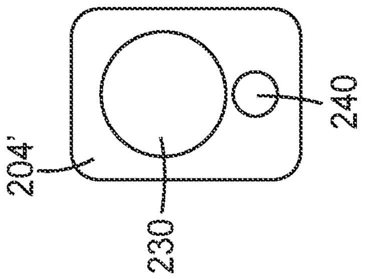
Figure 6C:
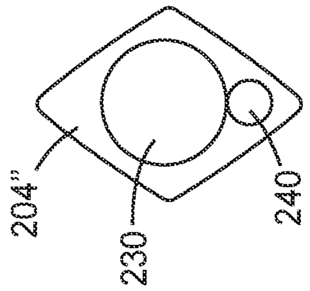
Figure 6D:
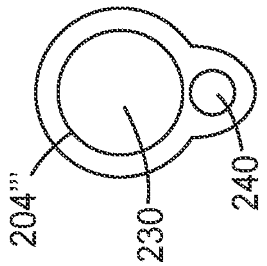

In some embodiments, the cross-sectional shape of the casing 204 may be an oval, an ellipse, an obround, or a combination thereof, as shown in FIG. 6A. In some embodiments, the cross-sectional shape of the casing 204 is a rectangle or other quadrilateral shape (e.g., a rhombus), such as the casing 204' and casing 204" shown in FIGS. 6B and 6C, respectively. The cross-sectional shape may have rounded corners, as shown. In some embodiments, the cross-sectional shape of the casing 204 is a combination of two (or more) shapes, such as the casing 204'" shown in FIG. 6D.

When the earhook 200 is in use, the earhook 200 is curved along its length L200. The curve of the earhook 200 may define a plane (e.g., the plane of the drawing in FIG. 1A) where the major cross dimension D204 extends along the plane and the minor cross dimension d204 is transverse to the plane. That is, the cable 230 and the support wire 240 may be stacked along the major cross dimension D204 such that they are in the same plane when the earhook 200 is curved.

The casing 204 may be made of any suitable material. Preferably the material has a suitably low hardness, such as a Shore A hardness of 30 to 80. In some embodiments, the casing 204 is made of materials with a Shore A hardness of 40 or greater, 50 or greater, 60 or greater, or 70 or greater. The material may have a Shore A hardness of 80 or less. In one embodiment, the casing 204 is made of material with a Shore A hardness of about 75. The material may have an elongation of 250% or greater or 500% or greater. The material may have an elongation of 1000% or less. The material may have an elongation ranging from 250% to 1000%, or from 500% to 1000%. In one embodiment, the casing 204 is made of material with an elongation about 740%. In some embodiments, the casing 204 is made of an elastomer. Examples of suitable elastomers include a silicones, thermoplastic elastomers, thermoplastic polyurethanes, and the like. For example, the casing 204 may be constructed from styrene butadiene copolymer ("SBC"). An example of a suitable SBC is commercially available as FR 85A 94-HB from Dongguan Huize Industrial Co., Ltd. in Dongguan City, Guangdong, China. In some embodiments, the casing 204 is constructed of a pre-formed tube, such as a dual lumen tube. Pre-forming may include, for example, injection molding or extrusion.

The wire 240 may be made of any suitable material. In some embodiments, the wire 240 is made of a material that has a low elastic modulus that allows the user to custom shape the earhook 200 as desired. The wire 240 may be made of a material having an elastic modulus of $30 \cdot 10^6$ psi (207 GPa) or less or $25 \cdot 10^6$ psi (172 GPa) or less. The elastic modulus of the material may be $5 \cdot 10^6$ psi (34 GPa) or greater or $10 \cdot 10^6$ psi (69 GPa) or greater. In some embodiments, the wire 240 is made of a metal having an elastic modulus in the range of $5 \cdot 10^6$ psi (34 GPa) to $30 \cdot 10^6$ psi (207 GPa). Examples of suitable materials include malleable metals, such as brass, copper, phosphor bronze, aluminum, stainless steel, nitinol, and the like. In one embodiment, the wire 240 is made of brass.

Figure 7:
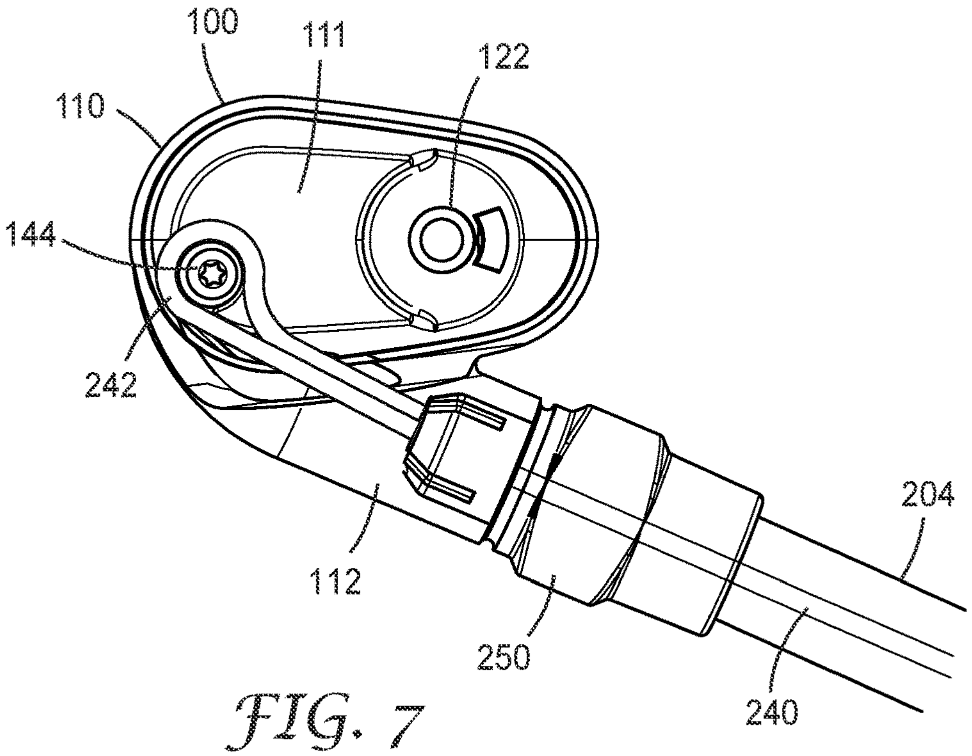
FIG. 7 is a side view of an earpiece of FIG. 1A, an overmold, and support wire, with a portion of the earpiece cover removed to show certain internal components, according to an embodiment.
Figure 8A:
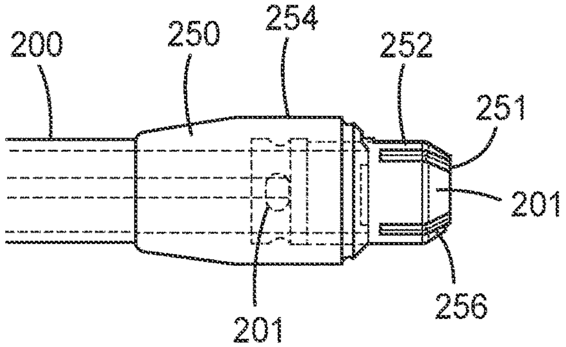
FIG. 8A is a side view of an overmold of the earhook of FIG. 1A according to an embodiment.
Figure 8B:
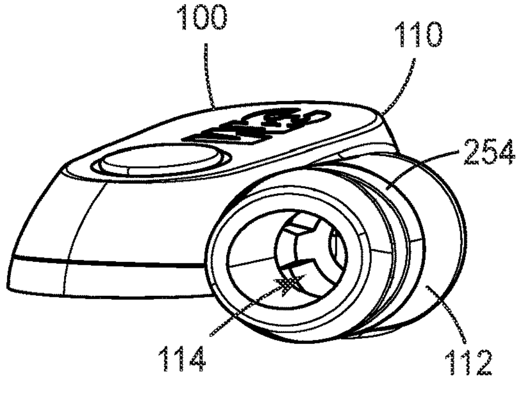
FIG. 8B is a perspective view of the earpiece of FIG. 1A with the earhook removed according to an embodiment.
Figure 9A:
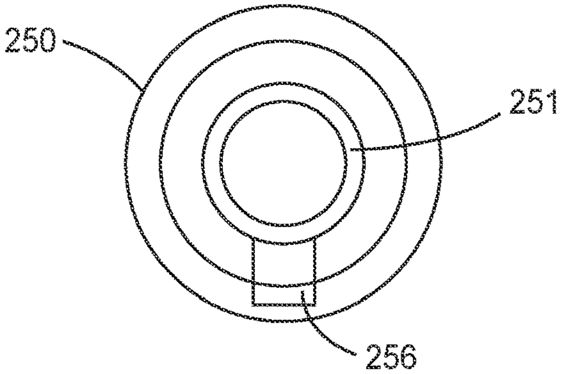
FIG. 9A is a simplified schematic of the end of the overmold of FIG. 8A showing the keyed connection according to an embodiment.
Figure 9B:
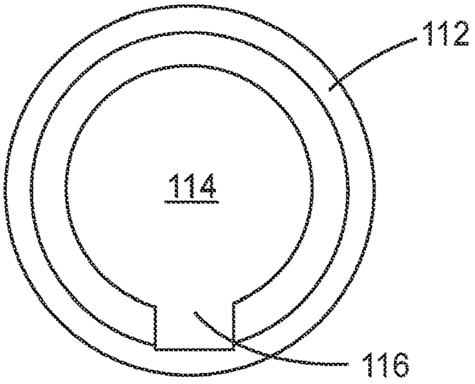
FIG. 9B is a simplified schematic of the cross-section of the cable extension of the earpiece of FIG. 8B showing the keyed connection according to an embodiment.

A detailed view of the earpiece 100 is shown in FIG. 7, showing some of the internal components. The earpiece 100 may have a housing 110 constructed to house the internal components, such as a speaker 122, a microphone, and the like. The internal components may be housed within a main compartment 111 of the housing 110. The housing 110 may be shaped ergonomically for use in an ear. The housing 110 may form a speaker port 124 extending from the main compartment 111 (see, e.g., FIG. 2). The speaker port 124 may be a tubular protrusion with an opening at the end. The speaker port 124 may be removably connectable with an eartip 126. The housing 110 may further include a cable extension 112 protruding from the main compartment 111 of the housing. The wire 240 and the cable 230, connected at one end to one or more of the inner components of the earpiece 100, may extend through the cable extension 112.

Referring now to FIGS. 5C and 7-10, details of the first overmold 250 are shown. The first overmold 250 may serve several purposes, including coupling the first end 201 of the earhook 200 with the earpiece 100. The fist overmold 250 may also help anchor the earhook 200 to the earpiece 100, and to maintain the orientation of the earhook 200 relative to the earpiece 100. The first overmold 250 may couple with the cable extension 112 of the earpiece 100. As shown in FIG. 8A, the first overmold 250 may cover the casing 204 at the first end 201 of the earhook 200. The first overmold 250 may have an end 251, defining the first end 201 of the earhook 200. The first overmold 250 may be constructed of two parts, including an inner overmold 252 and an outer overmold 254. The inner overmold 252 may extend past the outer overmold 254 at the end 251.

Figure 10:
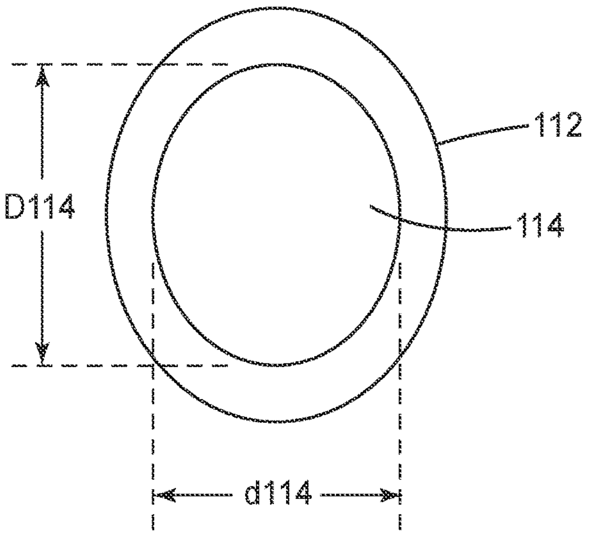
FIG. 10 is a transverse cross section of the overmold of FIG. 7 according to an embodiment.

The first end 251 of the first overmold 250 may be constructed to be inserted into a cavity 114 of the earpiece 100. The cavity 114 may be formed within the cable extension 112 of the earpiece 100. In some embodiments, the first overmold 250 and the cable extension 112 have a keyed connection, shown in FIGS. 8A-9B. The first overmold 250 may include a protrusion 256 (e.g., a key) and the cavity 114 may include a corresponding recess 116 constructed to couple with the protrusion 256. The keyed connection may help prevent twisting of the earhook 200 relative to the earpiece 100. Alternatively or in addition, the first overmold 250 and the cavity 114 may have a transverse cross section with a minor cross dimension d114 and major cross dimension D114, where the minor cross dimension d114 is smaller than the major cross dimension D114, as shown in FIG. 10. The cross-sectional shape of the first overmold 250 and the cavity 114 may reflect the cross-sectional shape of the casing 204. That is, the profile of the cross-sectional shape of the first overmold 250 may be the same or similar as but larger than the cross-sectional shape of the casing 204.

The first and second overmolds 250, 260 may be made from any suitable materials. In some embodiments, the first and second overmolds 250, 260 are made from a polymeric material. The first and second overmolds 250, 260 may be made of an elastomer. The first and second overmolds 250, 260 may be made of the same material or from different materials. Preferably, the material of the first and second overmolds 250, 260 is selected such that the material adheres to the casing 204 upon molding. The material of the first and second overmolds 250, 260 may adhere to the casing 204 without the use of an additional adhesive. In some embodiments, the material of the first and second overmolds 250, 260 meets or exceeds flammability ratings according to UL 94 HB (slow horizontal burn). The material of one or both of the first and second overmolds 250, 260 may be self-extinguishing according to UL 94. One or both of the first and second overmolds 250, 260 may be made of styrene butadiene copolymer ("SBC"). An example of a suitable SBC is commercially available as FR 85A 94-HB from Dongguan Huize Industrial Co., Ltd. According to an embodiment, the second overmold, the first overmold, or both the first and second overmolds is/are made of a material that is capable of gradually dispersing the bend deformation caused by the bending of the earhook 200. The second overmold, the first overmold, or both the first and second overmolds may be made of a material that has a Shore A hardness of 40 or greater or 50 or greater. The Shore A hardness of the material may be 85 or less, or 75 or less. In some embodiments, the second overmold, the first overmold, or both the first and second overmolds is/are made of a material with a Shore A hardness ranging from 40 to 85. Examples of suitable materials include silicones, thermoplastic elastomers, thermoplastic polyurethanes, and the like. In some embodiments, the inner overmold 252 and an outer overmold 254 of the first overmold 250 are made of different polymeric materials. For example, the material of the inner overmold 252 may be harder than the material of the outer overmold 254. The inner overmold 252 may have a Shore D hardness between 60 and 90, or between 70 and 75.

The support wire 240 extends from the first end 201 of the earhook 200 along at least a majority of the length L200 of the earhook 200. The wire 240 may extend from the first end 201 to the second end 202 of the earhook 200. Preferably, the wire 240 extends from inside the earpiece 100 to the second end 202 of the earhook 200. The wire 240 may extend through and beyond the first overmold 250, the second overmold 260, or both. In one embodiment, the wire 240 terminates at or inside the second overmold 260.

The support wire 240 may be anchored to the earpiece 100. According to an embodiment, the earpiece 100 includes an anchoring pin 144 for anchoring the support wire 240, as shown in FIG. 7. The anchoring pin 144 may be, for example, a screw. The wire 240 may have a loop 242 at the end that extends inside the main compartment 111 of the earpiece 100. The loop 242 may wrap around the anchoring pin 144. The wire 240 may terminate at the anchoring pin 144. That is, the wire 240 may extend from the anchoring pin 144 to the second overmold 260.

Illustrative Embodiments

According to a first embodiment, a headset comprises an earpiece comprising a speaker and a speaker port connectable with an eartip for insertion in an ear; an earhook comprising a first end coupled with the earpiece, a second end, and a length extending therebetween, the earhook having a transverse cross section along the length, the transverse cross section comprising a major cross dimension and a minor cross dimension orthogonal to the major cross dimension, the major cross dimension being greater than the minor cross dimension; and a cable and a support wire, connected to the earpiece and embedded in the earhook along the length.

Embodiment 2 is the headset of embodiment 1, wherein the length of the earhook is curved and defines a plane, and wherein the major cross dimension extends along the plane.

Embodiment 3 is the headset of any one of embodiments 1 to 2, wherein the cable and the support wire are stacked along the major cross dimension.

Embodiment 4 is the headset of any one of embodiments 1 to 3, wherein the transverse cross section is shaped as an ellipse, an oval, or an obround.

Embodiment 5 is the headset of any one of embodiments 1 to 4, wherein the earhook comprises a casing comprising one or more materials selected from silicones, thermoplastic elastomers, and thermoplastic polyurethanes. In one embodiment, the casing is constructed from styrene butadiene copolymer.

Embodiment 6 is the headset of any one of embodiments 1 to 5, wherein the support wire comprises a material having a flexural modulus of $30 \cdot 10^6$ psi (207 GPa) or less or $25 \cdot 10^6$ psi (172 GPa) or less. The elastic modulus of the material may be $5 \cdot 10^6$ psi (34 GPa) or greater or $10 \cdot 10^6$ psi (69 GPa) or greater. In some embodiments, the support wire is made of a metal having an elastic modulus in the range of $5 \cdot 10^6$ psi (34 GPa) to $30 \cdot 10^6$ psi (207 GPa) or $10 \cdot 10^6$ psi (69 GPa) to $25 \cdot 10^6$ psi (172 GPa).

Embodiment 7 is the headset of any one of embodiments 1 to 6, wherein the earhook comprises a first lumen housing the cable and a second lumen housing the support wire. The lumens may be separate or connected.

Embodiment 8 is the headset of any one of embodiments 1 to 7, wherein the cable has a first cross dimension and the support wire has a second cross dimension that is smaller than the first cross dimension.

Embodiment 9 is the headset of any one of embodiments 1 to 8, wherein the transverse cross section is shaped as an oval having a wide end and a narrow end, and wherein the cable is disposed within the wide end and the support wire is disposed within the narrow end.

Embodiment 10 is the headset of any one of embodiments 1 to 9, wherein the first end is encased in a first overmold coupling the earhook to the earpiece.

Embodiment 11 is the headset of embodiment 10, wherein a portion of the first overmold is inserted inside the earpiece.

Embodiment 12 is the headset of embodiment 10, wherein the first overmold has a transverse cross section that is shaped like the transverse cross section of the earhook.

Embodiment 13 is the headset of any one of embodiments 1 to 12, wherein the second end is encased in a second overmold. The second overmold may comprise a material having a Shore A hardness ranging from 40 to 85.

Embodiment 14 is the headset of embodiment 13, wherein the support wire extends through the first overmold.

Embodiment 15 is the headset of any one of embodiments 1 to 14, wherein the support wire extends inside the earpiece.

Embodiment 16 is the headset of embodiment 15, wherein the support wire terminates at a pin within the earpiece.

Embodiment 17 is the headset of embodiment 16, wherein an end of the support wire is wrapped about the pin.

Embodiment 18 is the headset of any one of embodiments 1 to 17, wherein the earhook is constructed of a pre-formed dual lumen tube.

Embodiment 19 is the headset of embodiment 18, wherein the pre-forming comprises injection molding or extrusion.

Embodiment 20 is the headset of any one of embodiments 1 to 19, wherein the minor cross dimension is 5.0 mm or less, 4.5 mm or less, 4.2 mm or less, 4.0 mm or less, 3.8 mm or less, 3.6 mm or less, or 3.4 mm or less. In one embodiment, the minor cross dimension is 4.0 mm or less.

Embodiment 21 is the headset of any one of embodiments 1 to, wherein the major cross dimension is at least 10%, at least 15%, at least 20%, or at least 25% greater than the minor cross dimension. The major cross dimension may be up to 100% greater than the minor cross dimension.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A headset comprising:

an earpiece comprising a speaker and a speaker port connectable with an eartip for insertion in an ear;

an earhook comprising a first end coupled with the earpiece, a second end, and a length extending therebetween, the earhook having a transverse cross section along the length, the transverse cross section comprising a major cross dimension and a minor cross dimension orthogonal to the major cross dimension, the major cross dimension being greater than the minor cross dimension; and a cable and a support wire, connected to the earpiece and embedded in the earhook along the length;

wherein the first end is encased in a first overmold coupling the earhook to the earpiece.

2. The headset of claim 1, wherein the length of the earhook is curved and defines a plane, and wherein the major cross dimension extends along the plane.

3. The headset of claim 1, wherein the cable and the support wire are stacked along the major cross dimension.

4. The headset of claim 1, wherein the transverse cross section is shaped as an ellipse, an oval, or an obround.

5. The headset of claim 1, wherein the earhook comprises a casing comprising an elastomer.

6. The headset of claim 1, wherein the support wire comprises a material having a flexural modulus of 30·106 psi (207 GPa) or less.

7. The headset of claim 1, wherein the earhook comprises a first lumen housing the cable and a second lumen housing the support wire.

8. The headset of claim 1, wherein the cable has a first cross dimension and the support wire has a second cross dimension that is smaller than the first cross dimension.

9. The headset of claim 1, wherein the transverse cross section is shaped as an oval having a wide end and a narrow end, and wherein the cable is disposed within the wide end and the support wire is disposed within the narrow end.

10. The headset of claim 1, wherein a portion of the first overmold is inserted inside the earpiece.

11. The headset of claim 1, wherein the first overmold has a transverse cross section that is shaped like the transverse cross section of the earhook.

12. The headset of claim 1, wherein the second end is encased in a second overmold comprising a material having a Shore A hardness ranging from 40 to 85.

13. The headset of claim 12, wherein the support wire terminates at the second overmold.

14. The headset of claim 1, wherein the support wire extends inside the earpiece.

15. The headset of claim 14, wherein the support wire terminates at a pin within the earpiece.

16. The headset of claim 15, wherein an end of the support wire is wrapped about the pin.

17. The headset of claim 1, wherein the earhook is constructed of a pre-formed dual lumen tube, optionally wherein the pre-forming comprises injection molding or extrusion.

18. A headset comprising:

an earpiece comprising a speaker and a speaker port connectable with an eartip for insertion in an ear;

an earhook comprising a first end coupled with the earpiece, a second end, and a length extending therebetween, the earhook having a transverse cross section along the length, the transverse cross section comprising a major cross dimension and a minor cross dimension orthogonal to the major cross dimension, the major cross dimension being greater than the minor cross dimension; and a cable and a support wire, connected to the earpiece and embedded in the earhook along the length;

wherein the cable has a first cross dimension and the support wire has a second cross dimension that is smaller than the first cross dimension.

19. The headset of claim 18, wherein the minor cross dimension is 4.0 mm or less.

20. The headset of claim 18, wherein the major cross dimension is at least 20% greater than the minor cross dimension.

21. A headset comprising:

an earpiece comprising a speaker and a speaker port connectable with an eartip for insertion in an ear;

an earhook comprising a first end coupled with the earpiece, a second end, and a length extending therebetween, the earhook having a transverse cross section along the length, the transverse cross section comprising a major cross dimension and a minor cross dimension orthogonal to the major cross dimension, the major cross dimension being greater than the minor cross dimension; and a cable and a support wire, connected to the earpiece and embedded in the earhook along the length;

wherein the transverse cross section is shaped as an oval having a wide end and a narrow end, and wherein the cable is disposed within the wide end and the support wire is disposed within the narrow end.

* * * * *